(12) United States Patent
Hoffman et al.

(10) Patent No.: US 6,780,480 B2
(45) Date of Patent: Aug. 24, 2004

(54) LAMINATED PACKAGE HAVING METALIZED PAPER

(75) Inventors: Roger P. Hoffman, Green Bay, WI (US); Gordon C. Wilkinson, Atlanta, GA (US)

(73) Assignee: Latentier, Green Bay, WI (US)

( * ) Notice: Subject to any disclaimer, the term of this patent is extended or adjusted under 35 U.S.C. 154(b) by 56 days.

(21) Appl. No.: 09/798,438

(22) Filed: Mar. 2, 2001

(65) Prior Publication Data

US 2001/0010845 A1 Aug. 2, 2001

Related U.S. Application Data

(60) Continuation-in-part of application No. 09/632,140, filed on Aug. 30, 2000, which is a continuation of application No. 09/205,506, filed on Dec. 3, 1998, now Pat. No. 6,099,674, which is a division of application No. 08/579,219, filed on Dec. 28, 1995, now Pat. No. 5,882,746.

(51) Int. Cl.[7] .......................... B29D 22/00; B29D 23/00; B32B 1/08; B32B 29/00; B65D 5/62
(52) U.S. Cl. .................. 428/34.2; 428/535; 428/537.5; 428/689; 229/5.81; 229/5.84
(58) Field of Search ................... 428/34.2, 195, 428/198, 200, 330, 337, 535, 537.5, 689, 903.3; 156/233, 250; 299/5.81, 5.84

(56) References Cited

U.S. PATENT DOCUMENTS

| | | | | | |
|---|---|---|---|---|---|
| 3,994,432 A | * | 11/1976 | Kirby, Jr. | ...................... | 229/52 |
| 4,254,173 A | * | 3/1981 | Peer, Jr. | ...................... | 428/204 |
| 4,273,816 A | * | 6/1981 | Tollette | ...................... | 428/34.2 |
| 4,473,422 A | * | 9/1984 | Parker et al. | ............... | 156/233 |
| 4,589,545 A | * | 5/1986 | Choe | .......................... | 206/264 |
| 4,806,398 A | * | 2/1989 | Martin, Jr. | ................. | 428/34.2 |
| 5,038,997 A | * | 8/1991 | St. Charles | ................. | 229/3.1 |
| 5,817,384 A | * | 10/1998 | Furuta et al. | .................. | 428/1 |
| 6,083,580 A | * | 7/2000 | Finestone et al. | .......... | 428/34.2 |
| 6,207,242 B1 | * | 3/2001 | Hoffman | .................... | 428/34.2 |
| 6,379,497 B1 | * | 4/2002 | Sandstrom et al. | ......... | 162/123 |

\* cited by examiner

*Primary Examiner*—Harold Pyon
*Assistant Examiner*—Catherine A. Simone
(74) *Attorney, Agent, or Firm*—Philip M. Weiss; Weiss & Weiss

(57) ABSTRACT

The present invention is directed to a laminated paperboard package having enhanced graphics and to a method of producing the same. The present invention uses metalized paper to enhance the quality of the packaging.

7 Claims, No Drawings

LAMINATED PACKAGE HAVING METALIZED PAPER

RELATED APPLICATIONS

The present application is a continuation in part of Ser. No. 09/632,140, filed Aug. 3, 2000 now pending, which is a continuation of Ser. No. 09/205,506, filed Dec. 3, 1998 now U.S. Pat. No. 6,099,674, granted Aug. 8, 2000; which is a divisional application of Ser. No. 08/579,219, filed Dec. 28, 1995, now U.S. Pat. No. 5,882,746, granted Mar. 16, 1999.

BACKGROUND OF THE INVENTION

In recent years with the advent of mega-retailers and mass merchandising, packaging has rapidly evolved. Today, more than ever, packaging is an extension of the marketing effort and product differentiation is often more important than the product itself. Thus product differentiation through enhanced printed graphics on the packaging is critical.

In the paper industry, the term "paperboard" is generally considered to include container board, such as corrugated boxes and linerboard, as well as boxboard, which includes beverage carriers, cereal boxes, milk cartons, small folded boxes, and the like. It has been recognized that sharp, precise graphics cannot be obtained when printing directly on paperboard products, due to the fact that the paperboard printing surface is relatively rough or uneven, as compared with clay coated paper. Further, paperboard normally has a grey or brown color, and printing directly on the darker color of the paperboard will tend to distract from the resolution of the graphics. To meet the demand for improved graphics, there have been attempts to use white packaging substrates produced from bleached pulp. While the white substrates provide enhanced printing surfaces, as compared with the normal brown and grey paperboard, the white paperboard is considerably more costly to produce and lacks the strength of an unbleached pulp substrate. Further, paperboard is relatively thick as compared to publication paper and cannot be printed through use of the modem high speed printing processes that are used for paper printing.

Beverage carrier, which is a type of paperboard, is designed to contain beverage cans in six-packs, twelve-packs, cases, or the like. As the beverage cans have considerable weight, it is important that the beverage have high tear strength. The typical beverage carrier is a two-ply product, generally consisting of a base ply of virgin Kraft formed from long soft wood fibers, which provide the increased tear strength, and an outer or top ply, generally formed of shorter fiber hardwood. The top ply typically receives a clay coating and graphics are then printed on the clay coated top ply. The printed sheet is then die-cut into sections and each section is folded and glued into the shape of a box or container to subsequently receive the beverage cans.

Due to the relatively rough surface of the coated paperboard, as compared to clay coated paper, the printed graphics do not have the fine or sharp resolution compared to graphics printed on paper. Further, it is difficult to produce the clay coated paperboard. Because of the dark color of the substrate, the clay coating must be thick enough to mask the color, but if the clay coating is too thick, it may crack and adversely effect the printed graphics.

A further problem in the production of beverage carrier is that the printing cannot be done on high speed offset presses as with paper, so that less sophisticated, lower speed printing equipment must be employed.

Thus, there has been a distinct need for paperboard packaging having enhanced graphics.

SUMMARY OF THE INVENTION

The present invention is directed to a laminated paperboard package having enhanced graphics and to a method of producing the same. It is an object of the present invention to use metalized paper to enhance the quality of the packaging. U.S. patent application Ser. No. 09/632,140, described the use of publication or other types of freesheet paper. The present invention provides a metalized paper to improve the graphic image. Metalized paper has a particular advantage in beverage packaging, where beer bottles contain metalized label paper (label paper is a type of freesheet paper) to improve the graphics by incorporating the metal substance in the design. Employing metalized paper has a functional advantage of being able to employ print methods and styles from the beer bottle label paper printing to the secondary carton printing.

The present invention relates to a laminated carton comprising a laminated composite sheet folded and secured in the configuration of a box. The sheet comprises a non-corrugated base layer of unbleached cellulosic fibers and has an inner surface and an outer surface. The laminated carton further comprises an outer layer of separately formed non-corrugated metalized paper having an inner surface and an outer surface with printed graphics disposed on the outer surface of the outer layer. An adhesive is disposed between the inner surface of the outer layer and the outer surface of the base layer. It is an object of the present invention for the laminated carton to have the inner surface of the outer layer to be bonded continuously to the outer surface layer of the base layer.

It is an object of the present invention to provide a method for a manufacturer to metalize a label or other types of freesheet or groundwood paper in a conventional manner. In accordance with the present invention, a paper is metalized and graphics are printed on the sheet. The printed sheet can then be wound in coil form and stored for subsequent application to a cellulosic substrate. Alternatively, after the metalized paper is printed, the paper can be used in an inline process, so that it is attached to a cellulosic substrate without having to be wound first.

When producing beverage carrier, the cellulosic substrate preferably consists of one or more plies of unbleached virgin Kraft pulp, while when producing a product such as cereal box, cellulosic substrate can be formed of one or more plies of recycled fibers. In a further embodiment the cellulosic substrate consists of coated unbleached Kraft board, commonly known as SUS, Solid Unbleached Sulfate, or CNK, Coated Natural Kraft.

At a carton manufacturing site, the coiled printed metalized paper is unwound and continuously applied to a surface of a moving cellulosic substrate and bonded to the substrate by an adhesive to thereby provide a laminated product.

After application of the printed metalized paper to the cellulosic substrate, the laminated product is then die cut into a plurality of sections or segments of desired shape and each section is then folded and glued to form the configuration of a box. The boxes, in flat folded shape, are shipped to the manufacturer of the product, the boxes are then opened, the product inserted and the end flaps are then glued or secured to provide the final packaged product for distribution.

In certain instances when dealing with beverage carrier, the beverage cans may be introduced into the laminated box in a refrigerated state. Subsequently, moisture may condense on the refrigerated cans, which can cause warping or disfiguration of the laminated box. To overcome this problem, a layer of water absorbent, cellulosic material, such as Kraft paper, corrugated medium, or newsprint can be applied to the inner surface of the cellulosic substrate prior to cutting and folding of the laminated sheet. The water absorbent cellulosic layer is applied to the inner surface of the substrate through use of a water resistant adhesive. The water absorbent layer can absorb any moisture which may condense on the cans within the package to prevent warping of the laminated package.

The present invention provides enhanced graphics for paperboard packaging by use of high speed printed on metalized paper, which is then bonded to a cellulosic substrate through an adhesive.

DETAILED DESCRIPTION OF THE INVENTION

The present invention is directed to a laminated printed package comprising a cellulosic substrate having a sheet of metalized paper printed with graphics applied to the outer surface of the substrate through use of an adhesive.

It is a further benefit of the present invention over prior art metalized film cartons that the metalized paper cartons are more environmentally friendly than metalized film cartons because metalized paper repulps and cleans with relative ease promoting recycling.

The paper web used in the present invention is preferably a free sheet or groundwood paper that has been metalized. In an embodiment, the metalized paper in coiled form is unwound and printed by conventional techniques, preferably by high speed, offset printing, operating at a speed generally in the range of 1500 to 3200 ft. per minute. After printing, the paper is rewound into coiled form and stored for subsequent application to a cellulosic substrate at the location of the carton manufacturer. Alternatively, after the metalized paper is printed, the paper can be used in an inline process, so that it is attached to the cellulosic substrate without having to be wound first.

The cellulosic substrate can be produced by conventional procedures and can consist of unbleached virgin Kraft pulp, recycled pulp produced from old corrugated containers, newsprint, white office waste, and the like, or mixtures or virgin pulp and recycled pulp. The substrate is produced in one or more plies and generally has a basis weight of 40 lbs. to 90 lbs. per 1,000 sq. ft., and a thickness of 0.012 to 0.025 inches. When producing beverage carrier, where high tear strength is required in the laminated product, long fiber, virgin soft wood pulp is preferred as the base layer of the substrate, and an outer or top ply of finer fiber hardwood pulp can be applied to the base ply. Wet strength chemicals may also be added to the pulp to enhance tear strength characteristics in the presence of moisture. When producing a laminated product that is designed to contain products of lesser weight, such as cereal boxes, milk cartons, or the like, the substrate can be formed of one or more plies of recycled pulp, produced from old corrugated cartons, newsprint, office waste, and the like.

The cellulosic substrate, when producing a high strength product, such as a beverage carrier, can be produced by a typical Kraft process, in which wood chips are cooked at a temperature of approximately 340 degrees F. with the addition of sodium hydroxide and sodium hydrosulfide (conventional Kraft white liquor) for a period of about 20 to 60 minutes to dissolve the lignin and hemicellulose. After cooking, the pulp is washed which acts to remove up to 98% of the treating chemicals. The pulp is then diluted with water to a solids content of about 4% and treated with sulfuric acid and alum to obtain the desired pH. The pulp stock is then delivered to the headbox of the forming section of the paper making machine, and the pulp slurry is fed from the headbox onto the forming fabric to provide a pulp mat.

Water is removed from the pulp mat by both gravity and mechanical induced vacuum, and the partially dewatered pulp then passes through the press section and drying section of the paper making machine, in a conventional manner, to produce the dry cellulosic substrate.

If the substrate consists of multiple plies, the pulp for each additional ply is fed from a second headbox located downstream of the first headbox onto the base ply to provide the composite structure in a conventional manner.

When producing paperboard packaging, such as cereal box, the cellulosic substrate will generally consist of multiple plies of recycled fibers. The pulping of the recycled fibers is carried out in a conventional manner, in which the recycled cellulosic waste is mixed with water and chemical dispersants, such as sodium hydroxide. The mixture is then subjected to a shear type of pulping agitation to break down the cellulosic waste into individual fibers and to liberate inks and toners. During pulping, the dispersant chemicals act to dissociate the ink from the fibers, and disperse the ink particles in the aqueous pulp slurry. Following the dispersion, the pulp can then be subjected to conventional ink removal operations, which can be accomplished either by froth floatation or dilution washing.

When utilizing virgin unbleached Kraft pulp, the cellulosic substrate will be brown in color, while the substrate formed from recycled materials will generally be grey in color.

At the site of the carton manufacturer, the printed metalized paper is uncoiled, and continuously bonded to the moving sheet of the cellulosic substrate through use of an adhesive. The metalized paper with the adhesive on its under surface is then applied to the upper surface of the cellulosic substrate to provide a laminated product which is passed through compression rolls to firmly bond the printed metalized paper to the substrate.

In the laminated product, in a preferred embodiment, the printed metalized paper extends over the entire surface area of the substrate. The laminated product is then die cut into a plurality of sections or segments of the desired shape or configuration. Each section is then folded and glued to form an open-ended box-like structure, and the flat boxes are then shipped to the manufacturer of the product to be contained. At the site of the product manufacturer, the flat boxes are opened, the product inserted, and the end flaps are then glued to provide the final packaged product that can be sent for distribution.

In certain instances, items, such as beverage cans, inserted into the laminated package may be cold or refrigerated, and in this case, moisture may condense on the cans. It has been found that the condensed moisture may tend to warp or disfigure the laminated package. To overcome this problem, a layer of water absorbent Kraft paper, corrugated medium or newsprint, can be applied to the inner surface of the cellulose substrate or base layer, through use of a water resistant adhesive which can take the form of an epoxy resin, urea formaldehyde resin, or the like. Any moisture condensing on the refrigerated cans will be absorbed in the inner layer of cellulosic material and will not migrate through the laminated package due to the barrier created by the water resistant adhesive, thus eliminating warping or other disfigurement of the package.

In a further embodiment, a layer or film of water resistant material, such as polyethylene film, can be applied to the inner face of the cellulosic substrate prior to cutting and folding of the laminated material. The water resistant film will prevent migration of water or moisture through the laminated package to aid in minimizing any warpage or disfigurement of the package.

The invention combines the strength of the publishing business with the need for enhanced graphics in packaging, by laminating printed rolls of metalized paper to a heavier weight cellulosic substrate, immediately preceding the die cutting, folding and gluing process.

What is claimed is:

1. A laminated carton comprising:
    a laminated composite sheet folded and secured in the configuration of a box;
    said sheet comprising a non-corrugated base layer of unbleached cellulosic fibers and having an inner surface and an outer surface;
    an outer layer of separately formed non-corrugated metalized paper having an inner surface and an outer surface; printed graphics disposed on the outer surface of the outer layer;
    an adhesive disposed between the inner surface of the outer layer and the outer surface of the base layer.

2. The carton of claim 1 wherein the inner surface of said outer layer is bonded continuously to the outer surface layer of said base layer.

3. The laminated carton of claim 1 wherein said cellulosic fibers are selected from the group consisting of unbleached virgin Kraft pulp and recycled pulp.

4. The laminated carton of claim 1 wherein said cellulosic fibers consist of coated unbleached Kraft board, commonly known as SUS, Solid Unbleached Sulfate, or CNK, Coated Natural Kraft.

5. The laminated carton of claim 1 further comprising a layer of water absorbent material dispose on the inner surface of said base layer.

6. The laminated carton of claim 5 further comprising a film of water resistant adhesive bonding said a absorbent material to said base layer.

7. The carton of claim 1 wherein said carton is a beverage carrier for beverage containers.

* * * * *